UNITED STATES PATENT OFFICE.

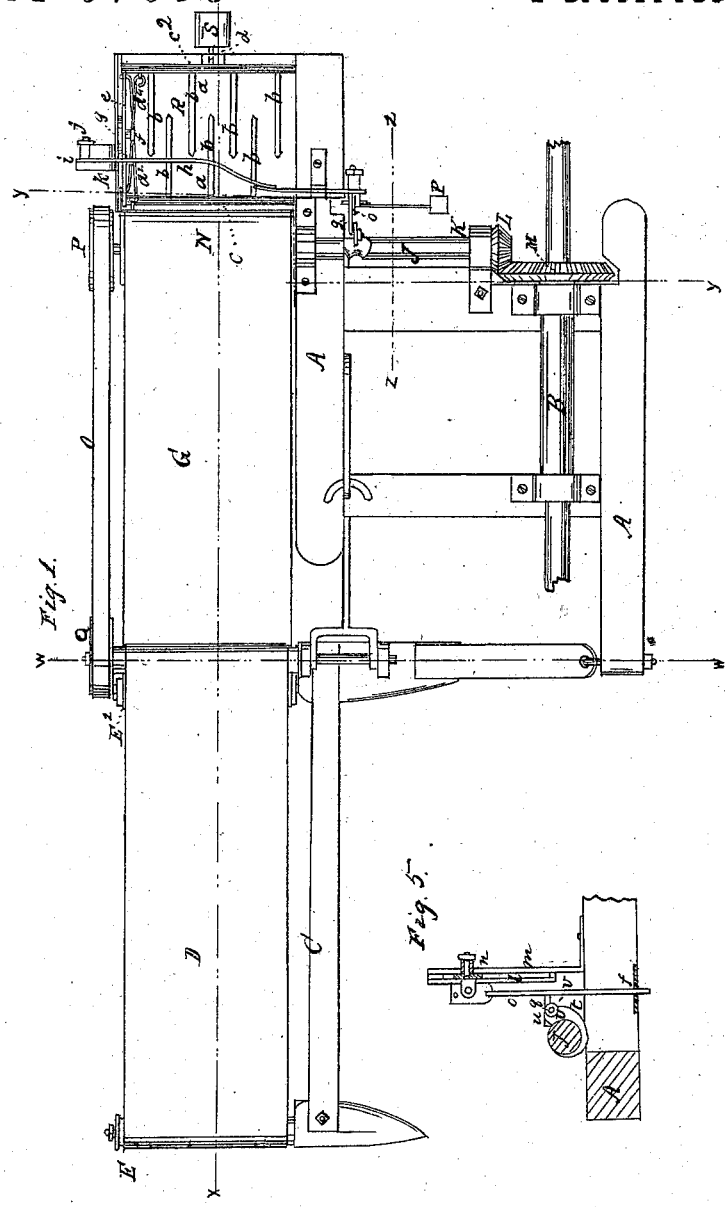

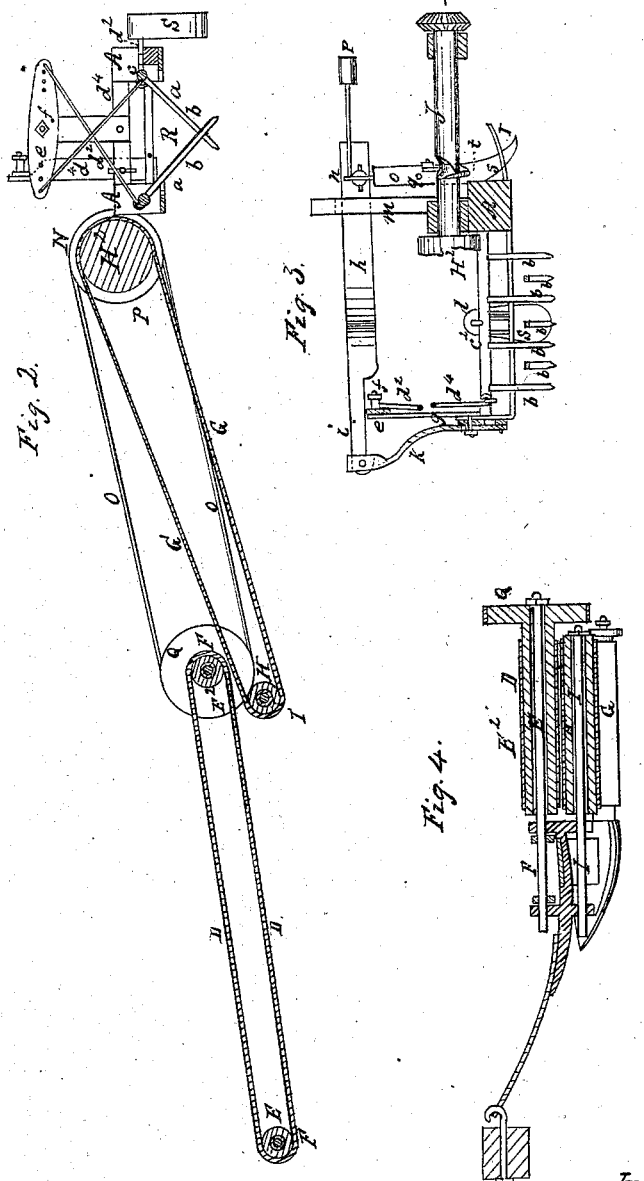

WILLIS W. SOWLES, OF MANLIUS, NEW YORK.

IMPROVEMENT IN HARVESTERS.

Specification forming part of Letters Patent No. 57,005, dated August 7, 1866.

*To all whom it may concern:*

Be it known that I, WILLIS W. SOWLES, of Manlius, in the county of Onondaga and State of New York, have invented new and useful Improvements in Harvesters; and I do hereby declare that the following is a full, clear, and exact description thereof, which will enable others skilled in the art to make and use the same, reference being had to the accompanying drawings, forming part of this specification.

In the harvester embraced by the present invention the grain, as fast as cut by the mower, is delivered to an endless carrying and traveling belt or apron arranged along the back side of the cutter-bar, by which it is carried and discharged into a cradle upon the rear portion of the mower, which cradle can be so adjusted that when thus filled with a certain amount of grain it will open, its two sides being properly arranged therefor, allowing the grain then to escape and fall to the ground when closing. It again opens when filled with the same weight of grain as before, and so on, the carrying-apron and cradle both receiving the proper motions through any suitable arrangement of devices connecting them with the driving or main axle shaft of the mower.

By this means the wheat or grain can be delivered from the mowing-machine in bundles or gavels of a uniform weight and size, the advantages and importance of which are obvious.

Having thus described the general principles of the present invention, I will now proceed to describe the same in detail, reference being had to the accompanying plate of drawings, of which—

Figure 1 is a plan or top view of a harvester with my improvements applied; Fig. 2, a transverse vertical section taken in the plane of the line $x\ x$, Fig. 1; Fig. 3, a vertical section taken in the plane of the line $y\ y$, Fig. 1; Figs. 4 and 5, vertical sections taken, respectively, through the planes of the lines $w\ w$ and $z\ z$, Fig. 1.

Similar letters of reference indicate like parts.

A in the drawings represents the frame of a mowing-machine to which my harvester attachment is applied. This frame is constructed in any proper manner and of the proper shape for the arrangement of devices to be hereinafter described as applied to it.

B is the main axle or driving shaft of the mower, turning in bearings of the frame A, to which axle-shaft, at each end, the driving-wheels are attached.

C is the cutter-bar, which is secured to the frame A in any of the ordinary and suitable modes, upon the rear side of which and extending its whole length, and in a direction across the machine, is an endless traveling belt or apron, D, hung at each end upon rollers E $E^2$, turning upon fixed horizontal shafts F F of the cutter-bar C. The end of this endless apron D, at the inner end of the cutter-bar, is slightly elevated above the outer end, and below it, extending in the same direction therewith and forming a continuation thereof, is another endless apron or belt, G, moving at each end over rollers H $H^2$, the lower one, H, turning upon a fixed shaft, I, of the cutter-bar, and the other or upper one, $H^2$, attached to a horizontal shaft, J, turning in bearings of the frame A, and connected at its inner end, K, with the main axle-shaft B through a small bevel-gear wheel, L, interlocking with a larger bevel-gear wheel, M, secured to the said axle-shaft. The end N of this second traveling apron, G, is placed considerably above the other end of the same.

O is an endless belt connecting the two rollers $H^2$ and $E^2$ together, respectively, of the two endless aprons D and G, passing over and around pulleys P and Q of the same.

At the upper end of the endless apron G, and in the same line therewith, is a cradle, R, the two sides $a\ a$ of which, across the width of the apron, consist each of a series of parallel bars, $b\ b^2$, interlocking at their lower ends with each other, and at their upper ends respectively attached to two horizontal parallel shafts, $c\ c^2$, hung and turning in bearings of the frame A. One of these rollers, $c$, has a weight, S, attached to its arm $d$.

$d^2\ d^4$ are rods, hung respectively at one end to the rollers $c\ c^2$, and crossing each other at right angles, or nearly so, and are hung at their other ends to the outer ends of a beam or lever, $e$, hung at its center upon a fulcrum-pin, $f$, of an upright, $g$, of the frame A.

Upon the inner portion of the lever $e$ rests the lower edge of a lever-bar, $h$, extending across the same, and hung at its end $i$ upon a fulcrum-pin, $j$, of the upright $k$ of the frame, the other end, $n$, of which lever passes through a vertical slot, $l$, of the upright $m$.

On the end $n$ of the lever-bar $h$ is hung a vertical lever, $o$, with a weighted arm, $p$, projecting from its upper end, and from which lever, toward and near the apron-driving shaft J, projects a stud or pin, $q$. The lower end of this lever $o$ plays through a horizontal slot, $r$, of the frame A, against one end of which it rests by its angular edge $s$. On and around the apron-shaft J, at or near and just in front of the position of the lever-stud $q$, before referred to, is a raised lip or snail, $t$, passing spirally around the shaft, at one end, $n$, of which is hung a grooved friction pulley or wheel, $v$.

The operation of the devices, arranged and connected together as above described, is as follows: As the grain is cut down by the drawing of the machine over the ground it falls over the cutter-bar upon the endless traveling apron D behind the same, by which, as it moves through the devices connecting it, as well also as the next apron G with the main axle-shaft B, it is carried along and deposited upon the next apron G, and by that still further carried, falling therefrom into the cradle R, in which it remains until a sufficient quantity has been thus deposited to overcome the weighted side $a$ of the same, when, by its pressure, it causes the sides to open sufficiently to depress the lever-bar $h$, (resting upon the beam $e$, to which the said sides $a$ $a$ are connected through the rods $d^2$ and $d^4$,) which thus throws the stud $q$ of its pendent arm $o$ upon the proper side of the apron-shaft snail $t$, that as it revolves, the said stud shall be abutted against by its friction-pulley $v$, which, pressing down upon the said stud through the devices connecting its lever $o$ with the cradle-sides $a$ $a$, sufficiently opens the sides to allow the grain contained in the cradle to fall to the ground, when the weighted side of the cradle immediately closes it, which at the same time throws the stud $q$ out of line of the snail-pulley $o$, and the cradle, when again filled as before, again opens and closes, and so on as long as the machine is operated.

By the arrangement of devices operating as above explained it is obvious that the grain, as fast as cut down and delivered to the harvester, can be in turn discharged therefrom to the ground in bundles or gavels of a uniform weight or size, which can be adjusted so as to be larger or smaller by simply increasing or decreasing the weight attached to one side of the cradle, as is apparent.

In lieu of the two carrying-belts D and G, one only may be used and the same results produced, their object being to convey the grain as fast as cut to the cradle R, arranged to operate to discharge its grain as described.

Having thus described my invention, I claim as new and desire to secure by Letters Patent—

The arrangement of devices for operating the cradle or receptacle R so as to discharge the grain delivered thereto from the cutters of the machine, the same consisting in hanging their sides $a$ (one of which is weighted) so as to swing, said sides being connected to a common beam or lever, $e$, by rods $d^2$ $d^4$, upon which beam rests a horizontal lever-bar, $h$, having a pendent arm, $o$, with its stud $q$, in combination with the snail $t$ and friction-pulley $o$ of the apron-shaft J, or its equivalent, of the machine, the whole being arranged together and operating substantially in the manner described.

WILLIS W. SOWLES.

Witnesses:
 HIRAM SMITH,
 OLIVER BATES.